(12) United States Patent
Kwon et al.

(10) Patent No.: US 8,505,463 B2
(45) Date of Patent: Aug. 13, 2013

(54) WHEEL-TYPE ULTRA HIGH SPEED RAILWAY SYSTEM

(75) Inventors: Sam-Young Kwon, Daejeon (KR);
Hyung-Woo Lee, Seoul (KR);
Chan-Bae Park, Gyeonggi-do (KR);
Byung-Song Lee, Gyeonggi-do (KR);
Hyun-June Park, Seoul (KR);
Yong-Hyeon Cho, Seoul (KR); Nam-Po Kim, Gyeonggi-do (KR); Sin-Chu Yang, Gyeonggi-do (KR); Jun-Suk Lee, Seoul (KR); Man-Cheol Kim, Seoul (KR); Kang-Youn Choe, Seoul (KR)

(73) Assignee: Korea Railroad Research Institute, Gyeonggi-do (KR)

( * ) Notice: Subject to any disclaimer, the term of this patent is extended or adjusted under 35 U.S.C. 154(b) by 182 days.

(21) Appl. No.: 13/142,193

(22) PCT Filed: Dec. 16, 2009

(86) PCT No.: PCT/KR2009/007532
§ 371 (c)(1),
(2), (4) Date: Jun. 24, 2011

(87) PCT Pub. No.: WO2010/076992
PCT Pub. Date: Jul. 8, 2010

(65) Prior Publication Data
US 2011/0259236 A1    Oct. 27, 2011

(30) Foreign Application Priority Data

Dec. 31, 2008  (KR) .................... 10-2008-0138433

(51) Int. Cl.
*B60L 13/00*     (2006.01)

(52) U.S. Cl.
USPC ............................................ 104/290; 104/281

(58) Field of Classification Search
USPC .................. 104/281, 282, 283, 290, 292, 293
See application file for complete search history.

(56) References Cited

U.S. PATENT DOCUMENTS 3,233,559 A * 2/1966 Smith et al. .................. 104/292
3,594,622 A * 7/1971 Inagaki ......................... 318/687
(Continued)

FOREIGN PATENT DOCUMENTS

| JP | 08-010962 B2 | 1/1986 |
| JP | 06-029019 B2 | 9/1989 |

(Continued)

OTHER PUBLICATIONS

English Language Abstract of JP 01-229761 A which is the application publication of JP 06-029019 B2.

(Continued)

*Primary Examiner* — Jason C Smith
(74) *Attorney, Agent, or Firm* — Rabin & Berdo, P.C.

(57) ABSTRACT

The wheel-type high-speed railway system includes rails provided on a railroad track and configured such that wheels provided in a bogie of a vehicle come into contact with them, a support provided on a tread surface of a railroad track between the rails, a repulsive Linear Synchronous Motor (LSM) provided between the bogie and the support and configured to improve traveling performance by reducing axle load in a high-speed region, first and second steel plates mounted on both sides of the support in inclined positions, and first and second attractive Dynamic Motion Control (DMC) magnets mounted on the bogie of the vehicle in inclined positions to correspond to the first and second steel plates, and configured to generate attractive force.

6 Claims, 13 Drawing Sheets

(56) References Cited

U.S. PATENT DOCUMENTS

| | | | |
|---|---|---|---|
| 3,602,149 A * | 8/1971 | Lich | 104/291 |
| 3,630,153 A * | 12/1971 | Guimarin | 104/138.1 |
| 3,641,939 A * | 2/1972 | Remy | 104/293 |
| 3,834,316 A * | 9/1974 | Hennings | 104/291 |
| 3,841,227 A * | 10/1974 | Fink | 104/130.02 |
| 3,854,411 A * | 12/1974 | Lichtenberg | 104/130.03 |
| 4,800,818 A * | 1/1989 | Kawaguchi et al. | 104/290 |
| 4,819,564 A * | 4/1989 | Brandis et al. | 104/292 |
| 4,940,444 A * | 7/1990 | Russell | 446/446 |
| 5,314,115 A * | 5/1994 | Moucessian | 238/30 |
| 5,552,649 A * | 9/1996 | Cowan et al. | 310/12.09 |
| 5,904,101 A * | 5/1999 | Kuznetsov | 104/281 |
| 6,178,892 B1 * | 1/2001 | Harding | 104/155 |
| 6,450,103 B2 * | 9/2002 | Svensson | 104/120 |
| 7,334,524 B2 * | 2/2008 | Roane | 104/2 |
| 2011/0259236 A1 * | 10/2011 | Kwon et al. | 104/138.1 |

FOREIGN PATENT DOCUMENTS

| | | |
|---|---|---|
| JP | 02-645406 B2 | 11/1989 |
| JP | 05-176417 A | 7/1993 |
| JP | 07-193914 A | 7/1995 |

OTHER PUBLICATIONS

English Language Abstract of JP 01-275258 A which is the application publication of JP 02-645406 B2.

English Language Abstract of JP 05-176417 A.

English Language Abstract of JP 07-193914 A.

English Language Abstract of JP 61-015502 A which is the application publication of JP 08-010962 B2.

International Search Report PCT/KR2009/007532 mailed on Jul. 6, 2010.

* cited by examiner

WHEEL-TYPE ULTRA HIGH SPEED RAILWAY SYSTEM

TECHNICAL FIELD

The present invention relates, in general, to a wheel-type high-speed railway system, and, more particularly, to a wheel-type high-speed railway system that enables stable travel at high speed in the range of 400-1,000 km/h even when standard steel wheels for a normal railway are used.

BACKGROUND ART

In general, a representative high-speed train system which travels at a speed of 430 km/h or more is a magnetic levitation (maglev) train.

Such maglev train systems include the German normal-conducting attractive-type Transrapid shown in FIG. 1 and the Japanese superconducting repulsive-type MLX Maglev shown in FIG. 2.

The German Transrapid employs a combined levitation propulsion and Linear Synchronous Motor (LSM), and controls a levitation air gap within an error range of ±0.1 mm.

Here, with regard to the supply of onboard power, the German Transrapid and the Japanese MLX receive electricity from a contact-type pantograph while traveling at a low speed of 160 km/h or less or when stopping, contactlessly receive electricity using an induction power supply method during high-speed traveling, and have onboard batteries in order to prepare for an emergency. In particular, the German Transrapid and the Japanese MLX should employ the above power supply method because a large amount of power is required to perform levitation at low speed or while stopping.

Another high-speed train system is a tube railway system in which a closed space called a tube is placed in a near-vacuum and a train travels across the space, and includes a system that is called the Swissmetro shown in FIG. 3.

Still another high-speed train system is a Magneplane system in which a train travels in a semi-circular runway, as shown in FIG. 4.

Meanwhile, recently, U.S. Powell and Danby proposed a maglev train system, as shown in FIG. 5. This system employs quadrupole superconducting magnets to achieve superconducting repulsive levitation and propulsion (using an LSM), thereby achieving the advantage of reducing construction expenses.

Meanwhile, since the above conventional maglev train systems use a method in which a train levitates and travels without using any support, they are subject to the vertical vibrations of a train, so that the air gap between the primary and secondary sides of a linear propulsion motor should be large.

As an example, in the German Transrapid system, when the traveling speed of a train is 450 km/h, the air gap is variably maintained in a range of 8-14 mm within an error range of +0.1 mm depending on the speed. In contrast, when the speed increases to 1,600 km/h or more, a greater air gap is required. Since the system employs a normal-conducting method, efficiency decreases because the magnetic flux density is low, so that the power consumption is high. In this case, the Transrapid employs a combined levitation propulsion and LSM. In order to control the levitation air gap within the error range of ±0.1 mm, the electrical power factor needs to be sacrificed, so that there arises the structural disadvantage of the power consumption increasing because of low electrical efficiency.

Meanwhile, the Japanese MLX system has an air gap in a range of 100-150 mm. From the fact that a rotary motor generally has an air gap in a range of 0.5-1 mm, it can be seen that the efficiency of a linear motor should be poor.

Furthermore, since the conventional maglev trains levitate and then travel using electrical force, they have skids for landing or small-sized emergency wheels and emergency batteries in order to prepare for an unexpected power failure. These emergency landing apparatuses still have many problems and have not been thoroughly certified. In particular, the small-sized emergency wheels do not have a tread profile and a traveling mechanism required by a railway rail-wheel combination, so that the wheels may be damaged or excessive frictional heat may be generated when there is a curve in a landing section. Moreover, in a high-speed region of 600 km/h or more, the skids may be damaged due to excessive frictional heat.

In the case of the Swissmetro, although the tube railway system is normally maintained in a near-vacuum state, the vacuum should be broken in case of an emergency. Since the speed at which the vacuum is broken is almost a sound speed of 1,224 km/h, the train vibrates when such a fast environmental variation occurs. In particular, when a train is vertically vibrated by shock waves while levitating and traveling, movements which threaten safety may be generated and damage in the form of train coils becoming scratched may occur.

Furthermore, since the railroad track structures of the maglev train systems of FIGS. 1 to 3 have a T-shaped railway or a railway having vertical walls, a large space is required in the tube type system and the construction of the facilities thereof requires high expenses, thereby posing the problem of increasing the required cost.

Furthermore, since a turnout for the conventional maglev trains requires that a heavy railroad track itself has to be moved, it is large in size, requires a long turnout time, occupies a large space, requires that the range of a closed tube space should be significantly expanded in the tube railway, and it is not easy to construct a 3 or more railroad track. Accordingly, this is an obstacle to the mass transportation system in which a plurality of vehicles is used and traffic is heavy. Furthermore, since the dispatch of a rescue train in case of an emergency or the passage of a maintenance vehicle is restricted by the complexity of the turnout, there are many difficulties from the point of view of train operation.

Meanwhile, it is difficult to implement a 600 km/h or more high-speed train in a normal open section due to noise and air resistance which increase by the square of the speed of a train in geometric progression when the speed of the train increases.

Furthermore, the adhesive power transmission of the conventional common trains is subject to restraints. Even when these restraints can be overcome, the general steel wheel-type systems still have restraints resulting from the problem of the rapidly increasing wear of rails and the like.

DISCLOSURE

Technical Problem

Accordingly, the present invention has been made keeping in mind the above problems occurring in the prior art, and an object of the present invention is to provide a wheel-type high-speed railway system in which general railway standard steel wheels are provided, a repulsive Linear Synchronous Motor (LSM) is disposed under a vehicle and between rails, and attractive Dynamic Motion Control (DMC) magnets are disposed on both sides of the LSM in inclined positions, so that a train is enabled to travel at high speed in the range of 400-1000 km by controlling the yawing, hunting and axle load of a vehicle at high speed.

In particular, an object of the present invention is to provide a wheel-type high-speed railway system that can realize stable wheel-type traveling at high speed because a vertical repulsive force which is incidental to propulsive force in a superconducting or normal-conducting repulsive LSM reduces the axle load by lifting up the vehicle in a direction extending upwards from the central line of a railroad track and because the DMC magnets disposed in inclined positions suppress the yawing (snake motion) and hunting of the vehicle by controlling the yawing, hunting and axle load of wheels, thereby enabling 400-1000 km/h high-speed travel.

Technical Solution

In order to accomplish the above objects, the present invention provides a wheel-type high-speed railway system, including rails provided on a railroad track and configured such that wheels provided in a bogie of a vehicle come into contact with them; a support provided on a tread surface of a railroad track between the rails; a repulsive Linear Synchronous Motor (LSM) provided between the bogie and the support and configured to improve traveling performance by reducing axle load in a high-speed region; first and second steel plates mounted on both sides of the support in inclined positions; and first and second attractive Dynamic Motion Control (DMC) magnets mounted on the bogie of the vehicle in inclined positions to correspond to the first and second steel plates, and configured to generate attractive force.

Here, the first and second steel plates and the first and second attractive DMC magnets may be inclined inward and upward at an angle in a range of 30-60°.

Furthermore, the railroad track may be a tube-type railroad track having a vacuum pressure which corresponds to $1/5$-$1/1000$ of an atmospheric pressure.

Moreover, the wheel-type high-speed railway system may further include first and second actuators provided on the bogie of the vehicle and configured to control a displacement and angle of first and second electromagnets of the first and second attractive DMC magnets.

Meanwhile, the wheel-type high-speed railway system may further include air gap detection means provided on the bogie of the vehicle and configured to detect air gaps between the first and second attractive DMC magnets and the first and second steel plates, and a control device may calculate distances of the air gaps using detected information of the air gap detection means.

Here, the air gap detection means may be formed of a laser sensor.

Furthermore, the repulsive LSM may include onboard electromagnets provided on the bogie and stator coils provided in an upper portion of a support fastened to a top of the railroad track.

Moreover, the interval between the rails may be a standard track gauge.

Advantageous Effects

According to the present invention, there is the advantage of achieving stable traveling up to 400-1000 km/h on a general standard railway section or on a tube railway (low vacuum corresponding to $1/5$-$1/1000$ atmospheric pressure) using a standard railway wheel-type system.

In particular, the high-speed railway system according to the present invention employs a wheel-type standard railway system, so that a turnout is considerably simplified compared to that of a conventional maglev train, branching is easy, and the range of a closed tube space can be minimized in the case where the present invention is applied to a tube railway and also three or more station turnout railroad tracks can be easily constructed since the turnout occupies a small space, thus being suitable for a mass transportation system including a plurality of vehicles.

Furthermore, the present invention has better safety than the conventional maglev trains and does not require energy to perform levitation and guidance due to the support of the load by the steel wheels because the vehicle is supported by the steel wheels and a mechanical brake which works in case of an emergency is provided, and can reduce the size of the air gap compared to the conventional maglev trains because the air gap between the onboard electromagnets of the repulsive LSM and the stator coils on the ground can be safely maintained by the tread profile of the steel rails and the wheels, thereby achieving the advantage of improving electrical efficiency.

Meanwhile, the present invention does not require the T-shaped railroad track (guideway) of the German Transrapid Maglev or the car body-tall vertical walls of the Japanese MLX but instead have only wheel-tall vertical sidewalls and a bottom track structure, so that the present invention provides a transverse section profile most suitable for a circular-shaped tube space, thereby achieving the effect of reducing construction expenses by minimizing the occupied space.

Furthermore, the conventional maglev trains employ the principle of induction power generation via the air gap between a car body and the ground using an onboard power generator, whereas the present invention enables a circular power generator using the rotation of an axle to be installed based on a minute air gap. Accordingly, the effects of improving electrical efficiency and reducing installation expenses are attained.

Moreover, the present invention can ensure interoperability for the mutual passage of railway vehicles because existing railways are all standard track gauge wheel-type railways, so that a maintenance train or a rescue train can pass over the railroad of the present invention, with the result that the system of the present invention has considerably higher maintainability and safety than the conventional maglev trains.

MODE FOR INVENTION

A wheel-type high-speed railway system according to the present invention will be described in detail below with reference to the accompanying drawings.

Figure 1:
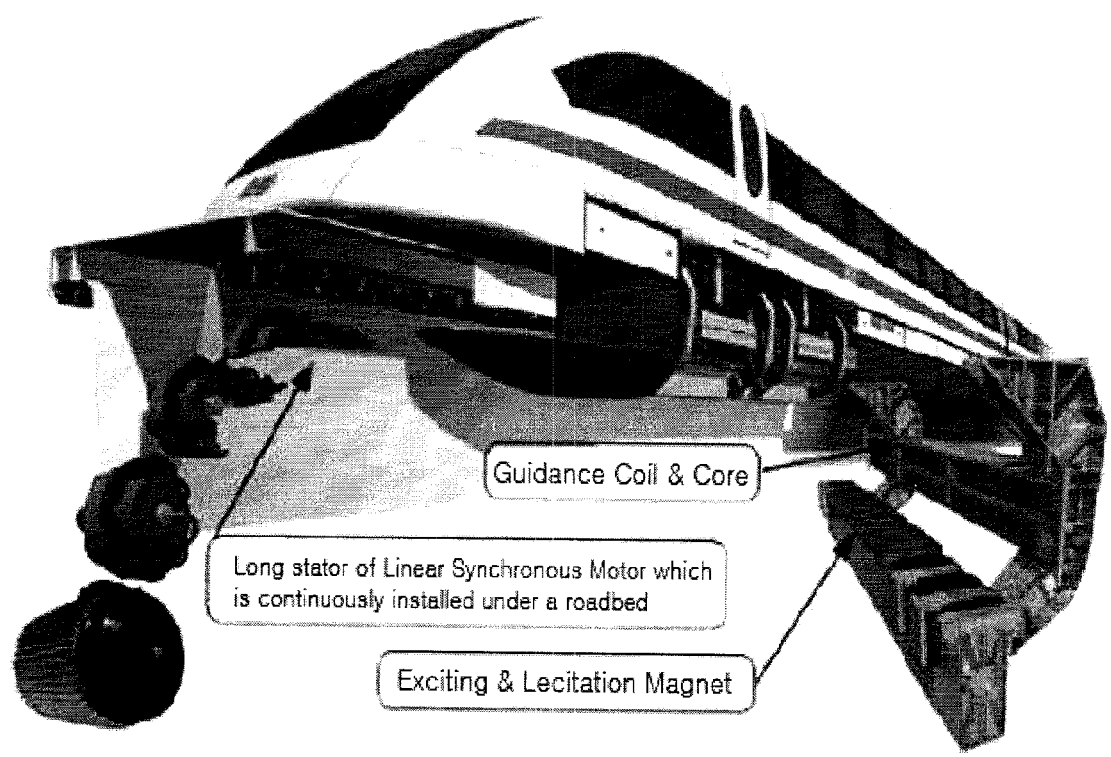
FIGS. 1 to 5 are views showing various examples of conventional maglev train systems.
Figure 2:
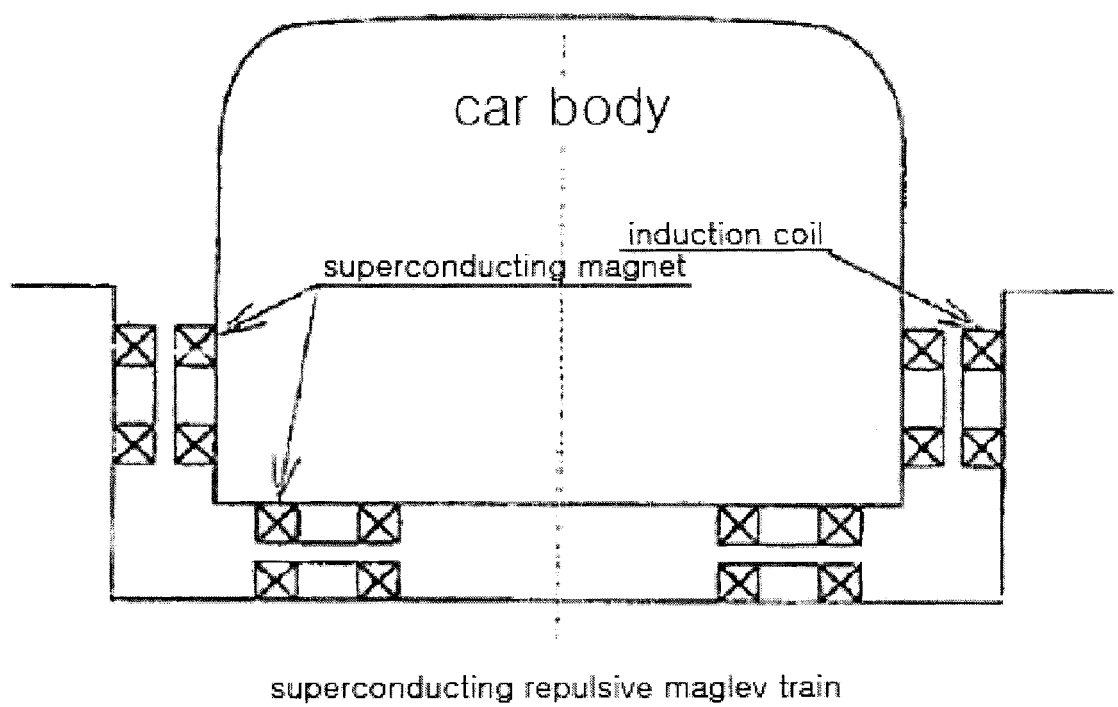
Figure 3:
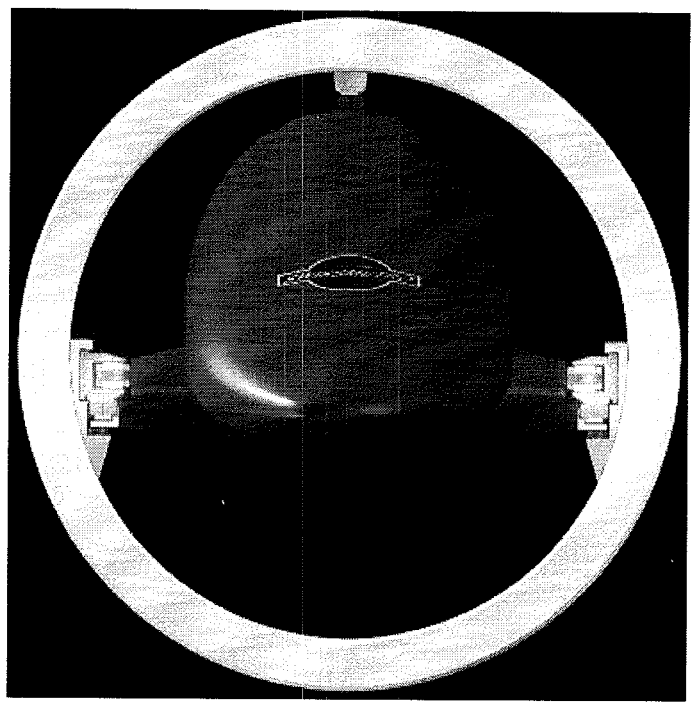
Figure 4:
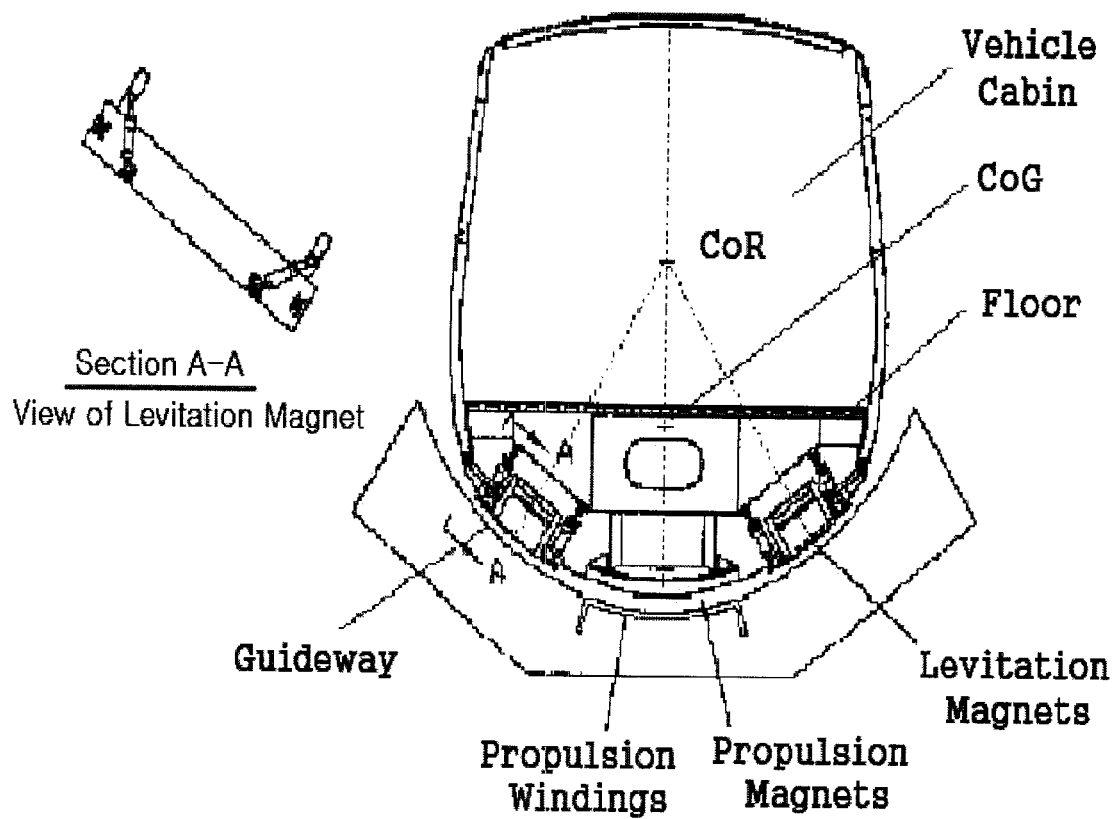
Figure 5:
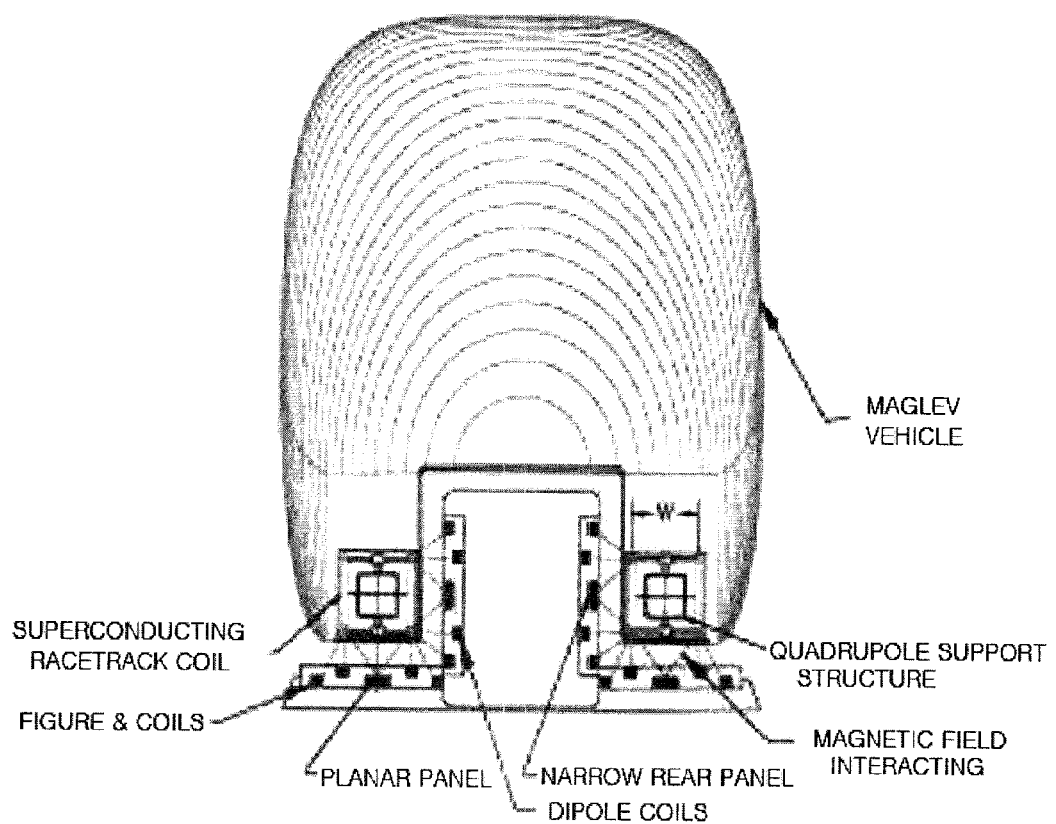
Figure 6:
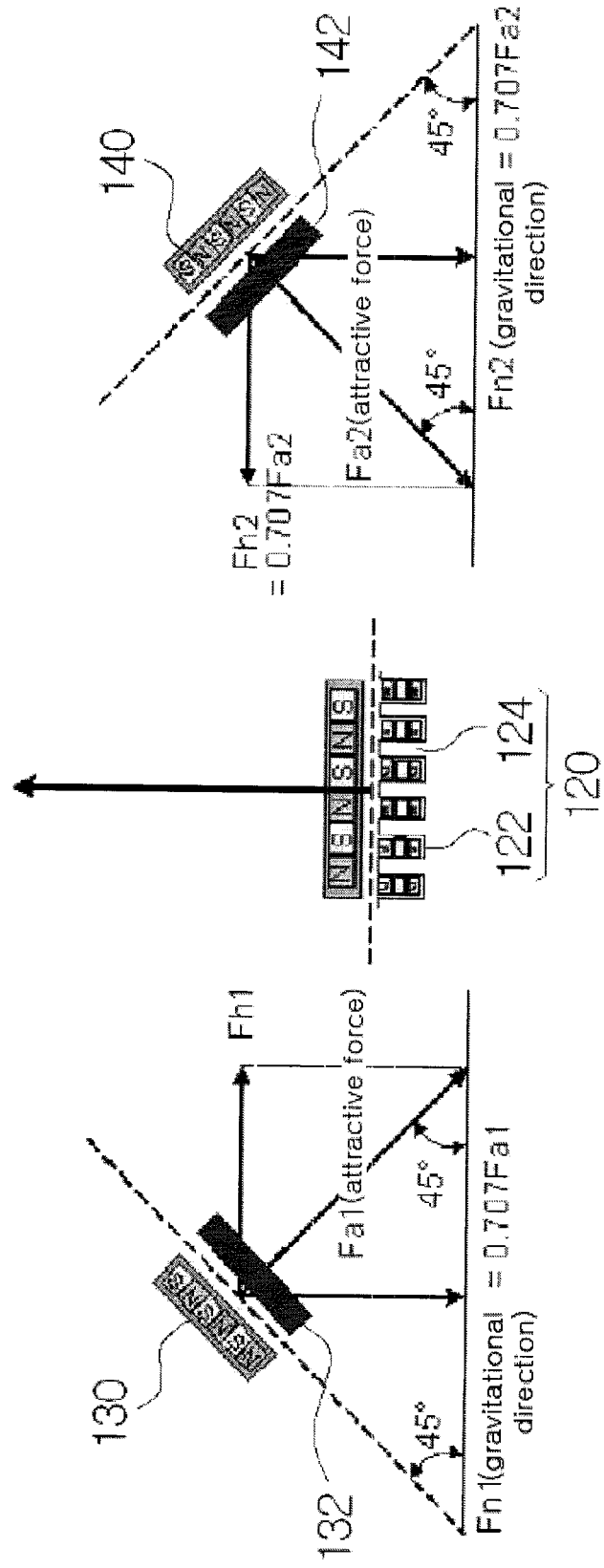
FIG. 6 is a diagram illustrating the operating principle of a wheel-type high-speed railway system according to the present invention.
Figure 7:
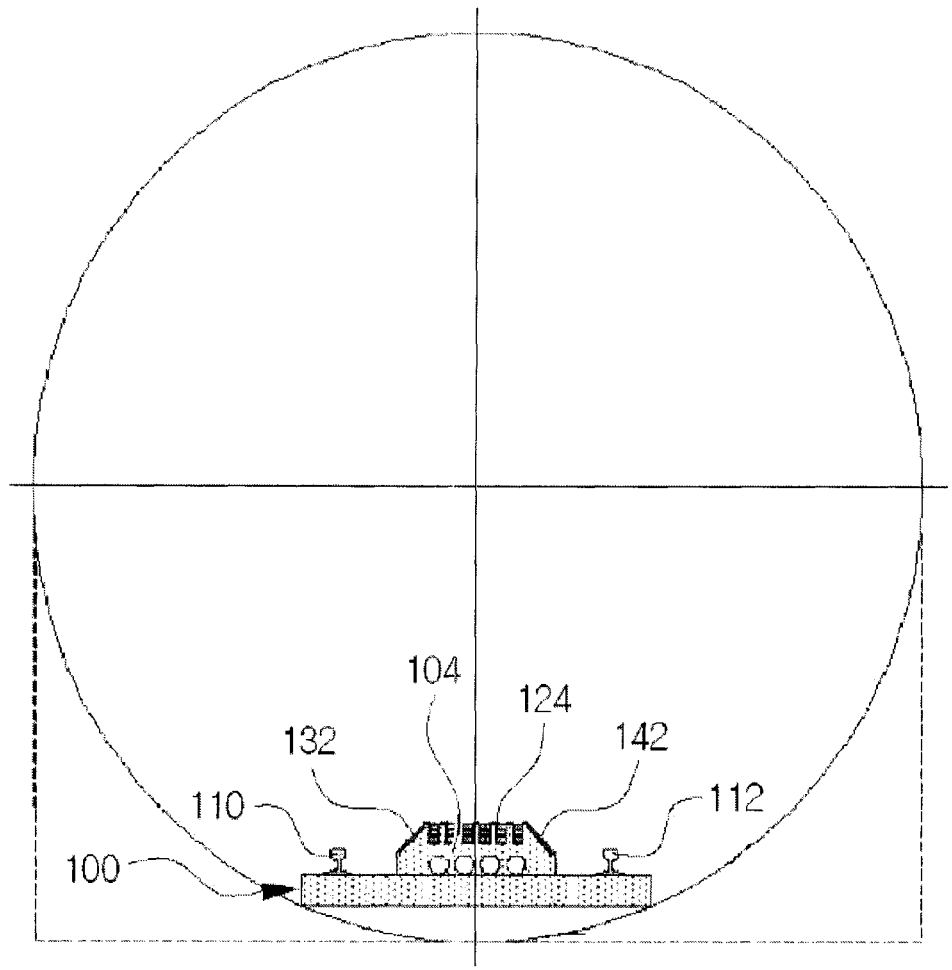
FIG. 7 is a sectional view showing the railroad track of the present invention.
Figure 8:
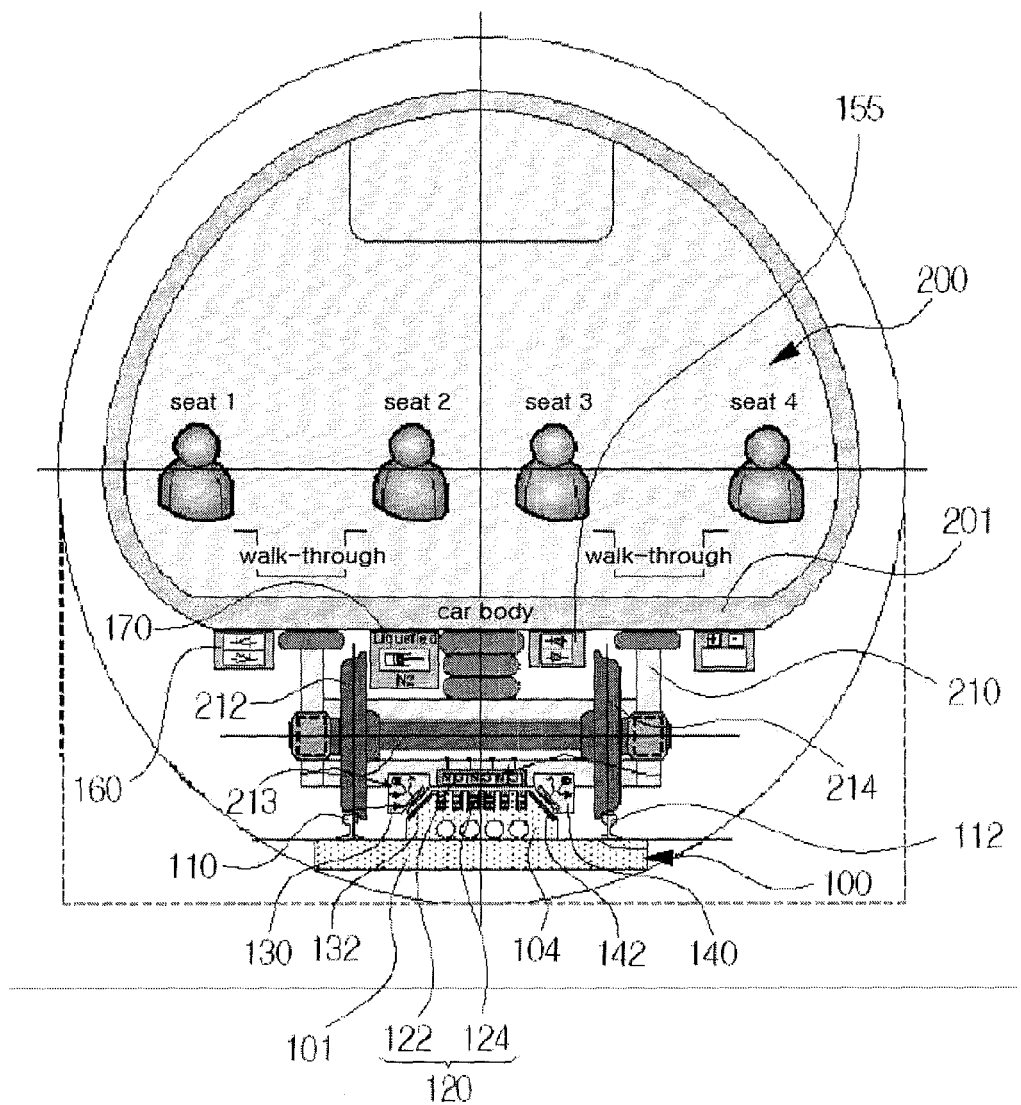
FIG. 8 is a sectional view showing a straight section of the railroad track of the present invention.
Figure 9:
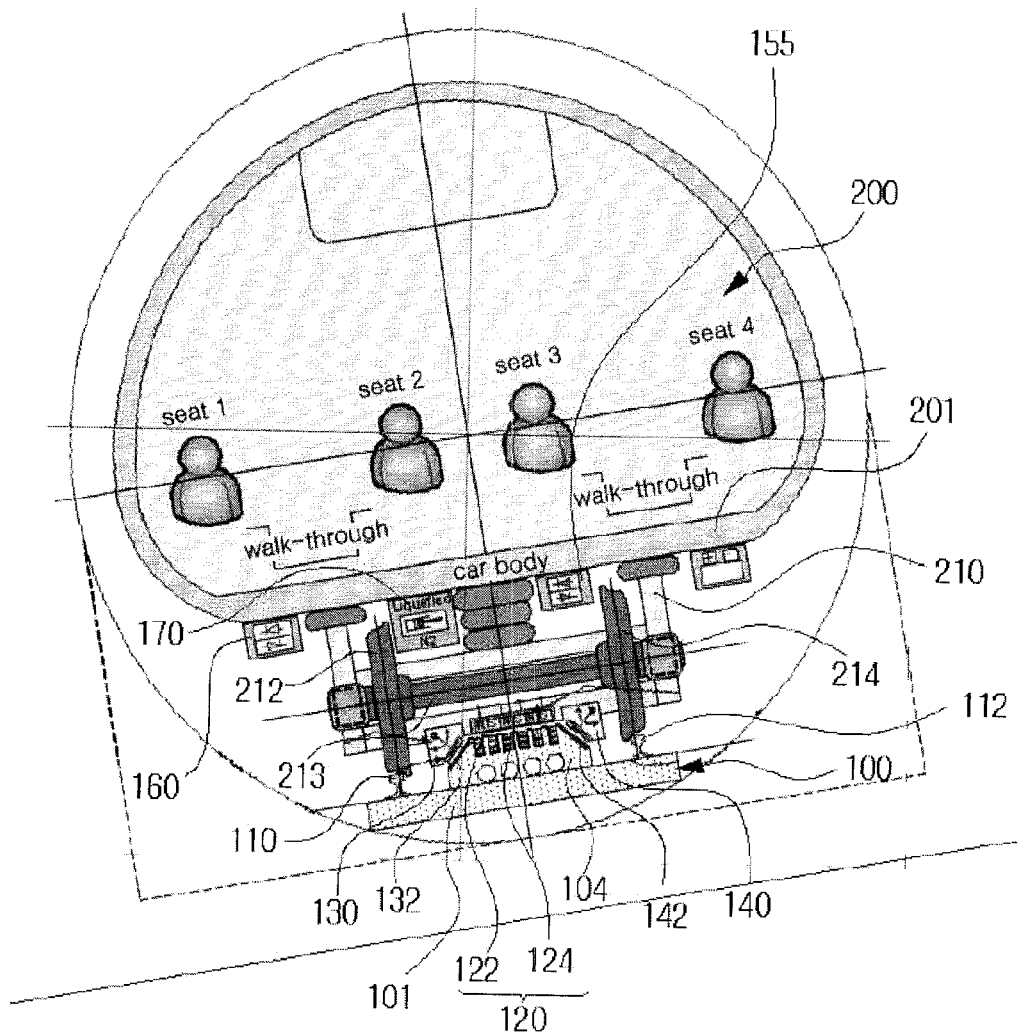
FIG. 9 is a sectional view showing a curved section of the railroad track of the present invention.
Figure 10:
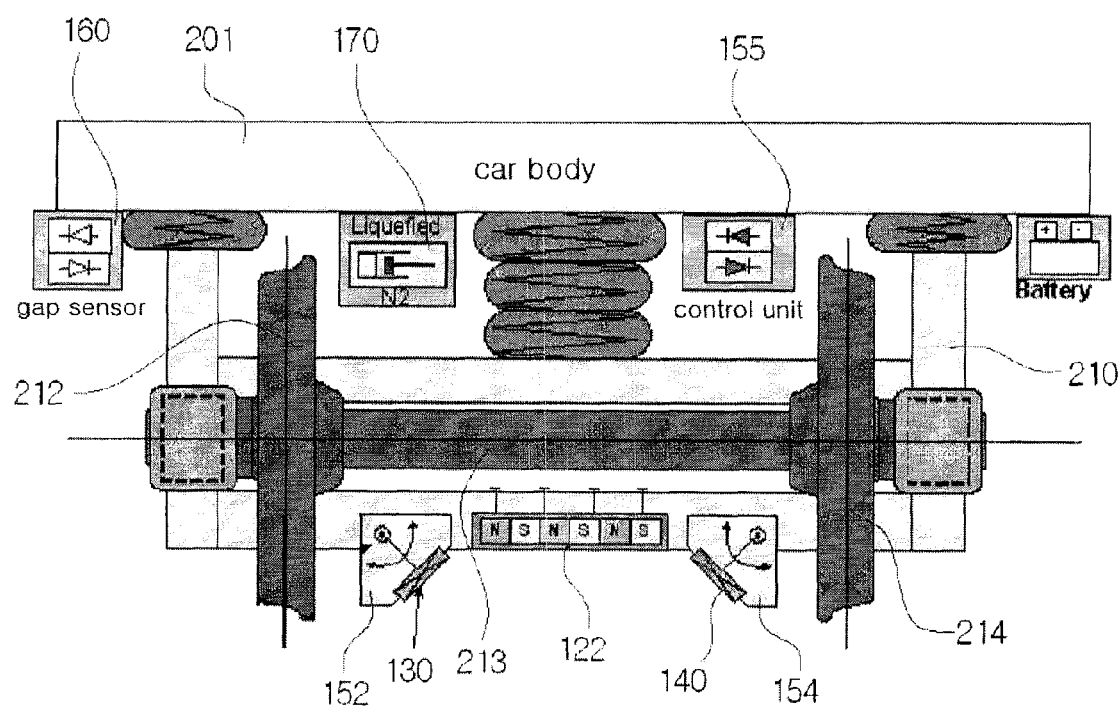
FIG. 10 is a front view showing the principle parts of the vehicle of the present invention.
Figure 11:
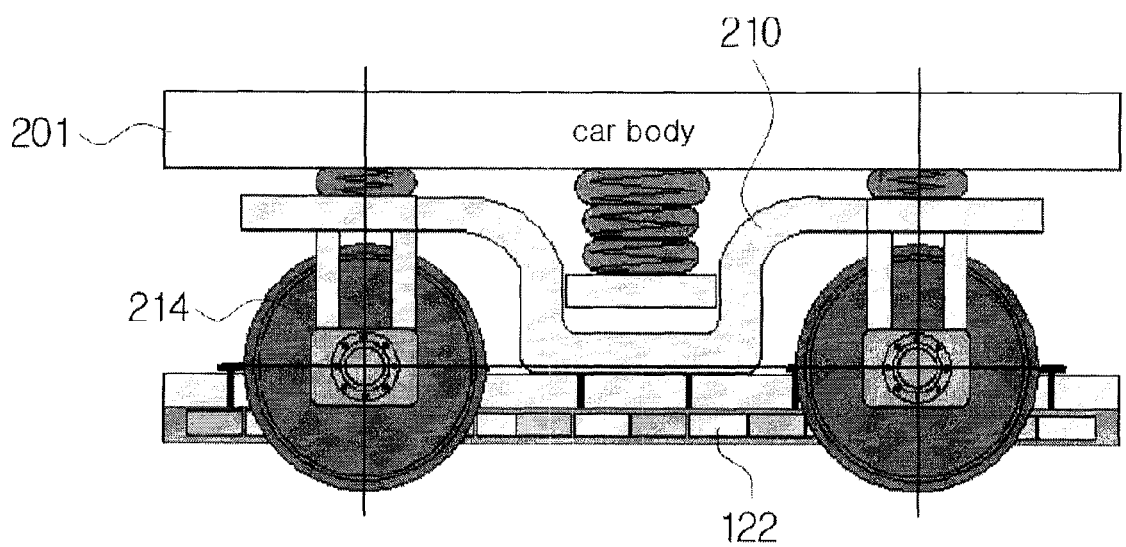
FIG. 11 is a side view showing the principle parts of the vehicle of the present invention.
Figure 12:
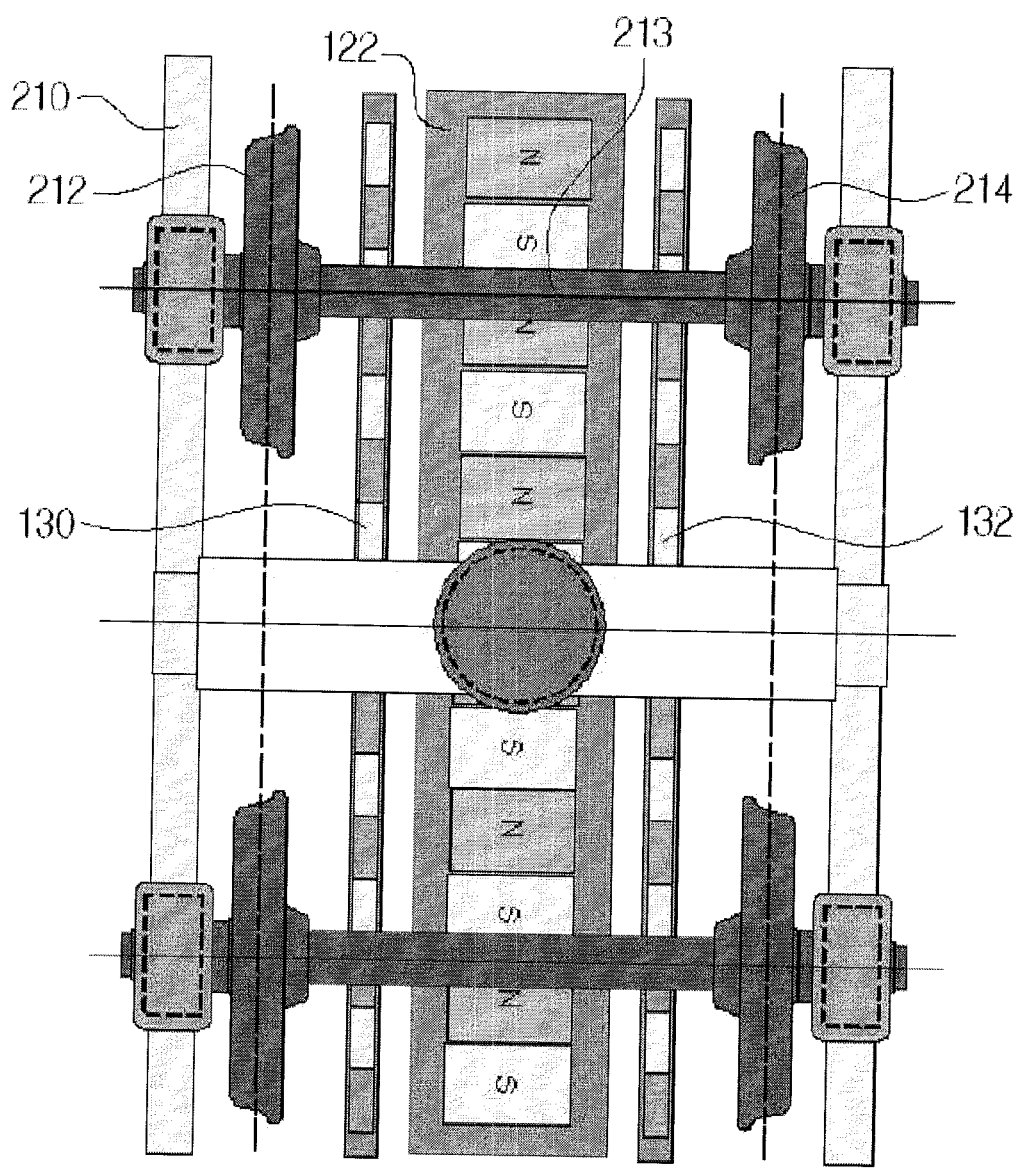
FIG. 12 is a plan view showing the principle parts of the vehicle of the present invention.
Figure 13:
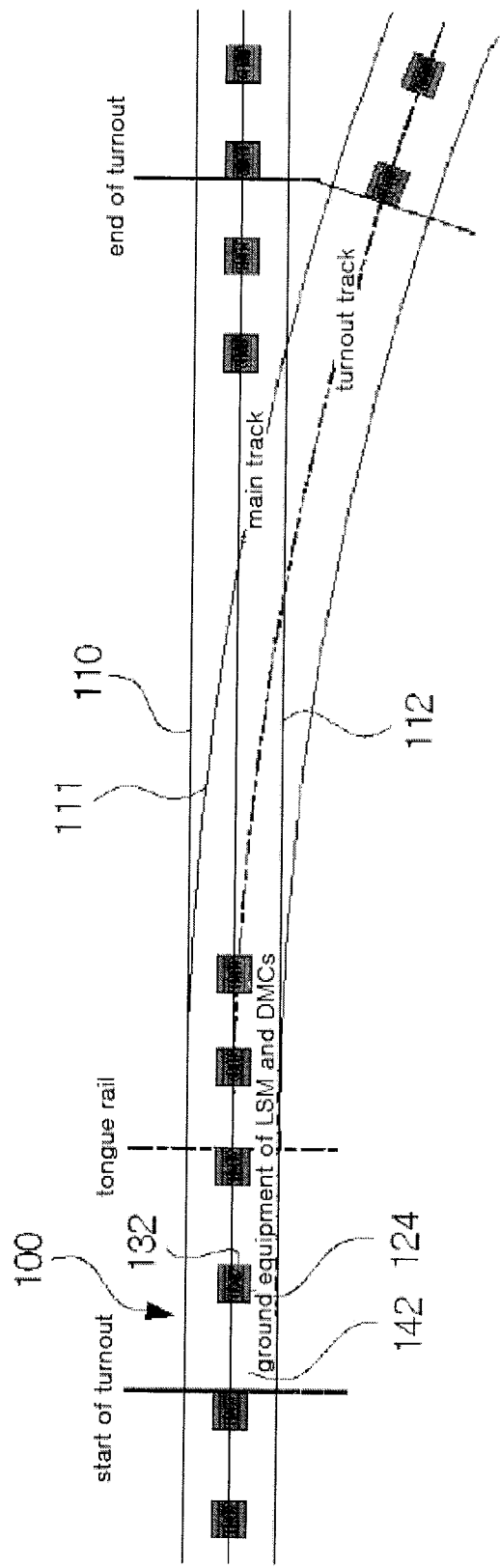
FIG. 13 is a diagram illustrating the control of a vehicle in a turnout section according to the present invention.

Here, FIG. 6 is a diagram illustrating the operating principle of a wheel-type high-speed railway system according to the present invention, FIG. 7 is a sectional view showing the railroad track of the present invention, FIG. 8 is a sectional view showing the straight section of the tube-type railroad track of the present invention, FIG. 9 is a sectional view showing the curved section of the tube-type railroad track of the present invention, FIG. 10 is a front view showing the principle parts of the vehicle of the present invention, FIG. 11 is a side view showing the principle parts of the vehicle of the present invention, FIG. 12 is a plan view showing the principle parts of the vehicle of the present invention, and FIG. 13 is a diagram illustrating the control of a vehicle in a turnout section according to the present invention.

Referring to FIGS. 6 to 12, the wheel-type high-speed railway system according to the present invention is configured in such a way that International Union of Railways (UIC) or Korean railroad standard rails 110 and 112 and trailing railroad wheels 212 and 214 having a standard tread profile are provided such that a vehicle 200 can travel along a railroad track 100 at a maximum speed in the range of 400-1000 km/h, a repulsive Linear Synchronous Motor (LSM) 120 is provided in a space under the vehicle 200 and between the rails 110 and 112 so that it generates force that reduces axle load (reduces unsprung mass) while propelling the vehicle 200 in a non-adhesive fashion, and first and second attractive Dynamic Motion Control (DMC) magnets 130 and 140 are disposed on both sides of the LSM 120 at an angle in the range of 30-60° (preferably 45°) so that lateral force and normal force are applied to a bogie 210 under a car body 201 in a vector manner, thereby suppressing the yawing and hunting of the vehicle 200 at high speed and controlling axle load.

The components of the wheel-type high-speed railway system according to the present invention will now be described in detail.

First, the repulsive LSM 120 is configured in such a way that superconducting or normal-conducting onboard electromagnets 122 are disposed in the lower center portion of the bogie 210 and coreless stator coils 124 are disposed in the upper portion of a support 104 at the center of the top of a rail track 101 on the ground. The repulsive LSM 120 uses the principle that repulsive force is generated while the vehicle 200 travels. Interlinking with the onboard superconducting or normal-conducting electromagnets 122 is performed, and a desired speed is achieved by adjusting the magnitude of propulsive force depending on the magnitude of the current of the stator coils 124 on the ground. Here, as the vehicle 200 travels, repulsive force is generated between the onboard electromagnets 122 and the coreless stator coils 124 on the ground. The repulsive force acts in the direction opposite the direction of gravity, that is, the direction in which the vehicle 200 is lifted up, along the central line of the rail track, thus resulting in a reduction in axle load. The magnitude of the repulsive force increases in proportion to the travelling speed of the vehicle 200.

In this case, the magnitude of the repulsive force is forcibly controlled based on various relation variables, such as the status of propulsive force, the speed of a vehicle, the line type, the real-time ratio of lateral pressure to wheel load, and section characteristics. The maximum magnitude of the repulsive force (axle load reduction force) is determined based on the characteristics of both the vehicle and the railroad track. However, it is preferable to perform control such that the axle load is reduced by 20% in a 400-600 km/h region, by 30% in a 600-700 km/h region, by 40% in a 700-800 km/h region, by 50% in a 800-900 km/h region, and by 60% in a 900-1000 km/h.

Next, the first and second attractive DMC magnets 130 and 140 are formed by installing superconducting or normal-conducting magnets in inclined positions of the car body. The attractive DMC magnets 130 and 140 generate electromagnetic attractive force in conjunction with first and second steel plates (or ferromagnetic elements 132 and 142 made of some other material), that are, flux paths, on both sides of the support 104, fastened at the center of the rail track 101 on the ground, which are disposed to correspond to the first and second attractive DMC magnets 130 and 140. Here, the attractive force is varied only by the magnitude of the current and air gap of the first and second attractive DMC magnets 130 and 140 of the car body.

Here, since the first and second attractive DMC magnets 130 and 140 are disposed in inclined positions, the attractive force of each of the first and second attractive DMC magnets 130 and 140 is decomposed into horizontal and normal components depending on the installation angle in a vector manner. The horizontal component is used to suppress or control the yawing of a vehicle, while the normal component is used to control the hunting of a vehicle.

A control device 155 is in charge of controlling the first and second attractive DMC magnets 130 and 140. The control device 155 primarily receives a signal regarding the air gap between the first and second attractive DMC magnets 130 and 140 in the car body and the first and second steel plates 132 and 142 on the ground, secondarily receives a signal regarding a section of the railroad track 100 (a straight section/a curved section/a turnout section) and a speed signal, and then receives information about lateral pressure and a wheel shaft and a signal regarding a influencing variable such as the magnitude of propulsive force.

When those signals are input, the control device 155 performs control in accordance with a predetermined control scenario for each case. The primary objective of the control is to control the yawing of the wheels 212 and 214 within a predetermined range (for example, within about ±2 mm in a 600 km/h straight section), the secondary objective is to smoothly suppress the hunting of the vehicle 200 at a value above a reference value, and the third objective is to compensate for insufficient cant in a curved section.

Meanwhile, since the normal components (in the case of 45°, which is 1.414 times the attractive force (=2×0.707)) generated by the first and second attractive DMC magnets 130 and 140 act in a direction extending downwards from the central line of the rail track 101 and the axle load reduction force (repulsive force) generated by the repulsive LSM 120 acts in a direction extending upwards from the central line of the rail track 101, they are opposite each other. However, since the first and second attractive DMC magnets 130 and 140 are intended to suppress or control the excessive lateral or normal movement of the dynamic movement of the vehicle 200 above a reference value during high-speed driving, it is sufficient that the size thereof ranges from 3% (for 400 km/h) of the vehicle 200's own weight to 15% (for 1000 km/h). In contrast, the axle load reduction force of the repulsive LSM 120 ranges from 20% (for 400-600 km/h) of the vehicle 200's own weight to 60% (for 900-1000 km/h). Accordingly, since the influence that is exerted on the axle load reduction force by the normal component of the repulsive LSM 120 is slight, the influence may be ignored.

The air gap between the car body and the ground is obtained by receiving an air gap signal from the repulsive LSM 120, two air gap signals from the first and second attractive DMC magnets 130 and 140 and an air gap signal for each vehicle 200 of the train (for example, an air gap signal at each location along the length of the train), synthesizing these signals with the inclination of the first and second attractive DMC magnets 130 and 140 and performing geometrical computation on them. Based on the results thereof, it is determined whether the current displacement of a vehicle results from yawing (snake motion), hunting or traveling along a curved section. Then high frequency response control suitable for the state is performed. As an example, a control algorithm is used in which when any one of the air gaps between the first and second attractive DMC magnets 130 and 140 and the first and second steel plates 132 and 142, which are being monitored in real time, is decreased, the attractive force of a corresponding attractive DMC magnet is made weaker than that of the opposite attractive DMC magnet by reducing the field current of the corresponding attractive DMC magnet, so that the central points of the wheels 212 and 214 return to the centers of the rails 110 and 112.

Meanwhile, in the turnout section of the railroad track 100, all of the stator coils 124 of the repulsive LSM 120 and the first and second steel plates 132 and 142 reacting to the first and second attractive DMC magnets 130 and 140 are not provided. Accordingly, turnout rails can be provided in a space between the rails 110 and 112, so that the turnout is a convenient turnout in which the vehicle 200 travels along turnout rails 111, like that of an existing standard railway. In the turnout section, the train coasts along it.

Furthermore, the first and second attractive DMC magnets 130 and 140 in the vehicle 200 and the onboard electromagnets 122 of the repulsive LSM 120 should be designed and installed based on a gauge that is set such that they do not come into mechanical contact with the first and second steel plates 132 and 142 and the stator coils 124 on a railroad track side in a straight section, in a curved section, while traveling or when stopping. They should be set such that they do not come into mechanical contact with the top surfaces of the turnout rails 111 in the turnout section.

For this purpose, first and second actuators 152 and 154 for mechanically controlling the displacements and angles of the first and second attractive DMC magnets 130 and 140 are provided on brackets 150, on which the first and second attractive DMC magnets 130 and 140 are mounted, located on the bogie 210 of the vehicle 200.

The air gaps between the first and second attractive DMC magnets 130 and 140 and the first and second steel plates 132 and 142 are related to the displacement resulting from the yawing of the vehicle 200 in a straight section, and the displacements are significantly different for maximum-speed travelling, low-speed traveling and the stopping of the vehicle and for each line type and cant in a curved section. For example, in the case where a cant provided in the curved section of the railroad track 100 is constructed to be suitable to the maximum possible traveling speed, when the vehicle 200 passes over the curved section at low speed or stops in the curved section, the vehicle may lean to the inside of the curve or slide. In this case, the air gap of the repulsive LSM 120 becomes smaller on the inside of the curve and larger on the outside of the curve.

Accordingly, in order to deal with the displacements predictable in light of the characteristics of the railroad track 100, the first and second actuators 152 and 154 are provided to control the displacements and angles of the first and second attractive DMC magnets 130 and 140.

Here, the first and second actuators 152 and 154 function to receive location, line type and speed information as feedback and perform previously known large air gap control to deal with the displacement of the wheel attributable to speed in previously known curved sections, in order to control the air gaps between the first and second attractive DMC magnets 130 and 140 and the first and second steel plates 132 and 142. By doing so, it is possible to keep the air gaps between the first and second attractive DMC magnets 130 and 140 and the first and second steel plates 132 and 142 small throughout the overall line, so that the electrical efficiency of the first and second attractive DMC magnets 130 and 140 may be generally improved. In this case, it is preferable to adopt actuators having the specification of a driving speed equal to or higher than 10 m/s, a driving displacement equal to or larger than ±50 mm and a driving force equal to or higher than 10 kN as the first and second actuators 152 and 154.

Meanwhile, when the first and second actuators 152 and 154 adjust the displacements of the first and second attractive DMC magnets 130 and 140, an algorithm is used in which the adjustment is performed during the cutoff of the supply of power to the first and second attractive DMC magnets 130 and 140 for 10 ms and the supply of power to the first and second attractive DMC magnets 130 and 140 is resumed immediately after the adjustment.

Here, there is provided air gap detection means 160 for detecting the air gaps between the first and second attractive DMC magnets 130 and 140 and the first and second steel plates 132 and 142 when the displacements of the first and second attractive DMC magnets 130 and 140 are adjusted by controlling the first and second actuators 152 and 154.

The above-described air gap detection means 160 may be installed on one side of the car body 201, and measure air gaps, that is, the distances between the first and second attractive DMC magnets 130 and 140 and the first and second steel plates 132 and 142. Here, the air gap detection means 160 is preferably formed of a laser sensor.

Meanwhile, the control device 155 controls the first and second attractive DMC magnets 130 and 140, and the repulsive LSM 120 and the first and second actuators 152 and 154, receives a detection signal from the air gap detection means 160, and performs the overall computation.

Furthermore, when the vehicle 200 travels along a curved section of the railroad track 100, in which an insufficient cant was installed, at the maximum speed, the vehicle 200 is easily subjected to leaning to the outside of the curve resulting from centrifugal force. In this case, a method of making the attractive force of the first or second attractive DMC magnet 130 or 140 on the inside of the curve greater than that of the first and second attractive DMC magnets 130 and 140 on the outside of the curve by adjusting the attractive force of the first and second attractive DMC magnets 130 and 140 helps passage through the curve at the maximum speed even when the insufficient cant was installed.

As described above, a vertical force (attractive force) control mechanism may be used in which, on the basis of the magnitude of centrifugal force resulting from the radius of the curve and the amount of cant, the current of the first or second attractive DMC magnets 130 and 140 on the inside of the curve and the current of the motion control and LSM on the outside of the curve are compared with each other and the sum of vectors in the lateral direction is caused to be in balance with the centrifugal force, thereby helping pass over the curved section.

Meanwhile, according to the above-described structure, the vehicle 200 can stably travel at a speed in the range of 400-1000 km/h. This is achieved by the composite action of the following features, that is, first, the repulsive LSM 120 reduces the axle load by 30% or higher under the axles, second, the first and second attractive DMC magnets 130 and 140 perform control using force corresponding to 3-15% of the vehicle 200's own weight in a high-speed region, third, it is easy to control the vibrations of the vehicle 200 because the vehicle 200 is propelled in a non-adhesive manner, and, four, the unsprung mass of the bogie 210 can be reduced because the power transmission gearbox can be omitted and also small-diameter wheels can be adopted thanks to the use of an unpowered trailing axle by the vehicle 200.

Meanwhile, a liquefied nitrogen tank 170 for cooling the superconducting magnets is provided in the car body. When an axle box is included in a liquefied nitrogen circulation route, the effect of cooling the wheels thanks to the conduction of steel as well as the bearing can be achieved, and therefore the obstacle to high-speed traveling may be eliminated.

Furthermore, the wheel-type high-speed railway system according to the present invention is preferably applied to a tube-type railway having a vacuum corresponding to $1/5$-$1/1000$ of the atmospheric pressure.

In the meantime, various track gauges ranging from 1000 to 2000 mm as well as a standard track gauge of 1,435 mm may be used as the interval between the rails 110 and 112 on the railroad track 100.

Meanwhile, although the first and second attractive DMC magnets 130 and 140 installed in the vehicle 200 are of a core type, they may be of a coreless type and guide magnets of a type that generates and controls attractive force may be added.

Furthermore, although it is preferable to use superconducting magnets in that, in the case of the onboard electromagnets 122 of the repulsive LSM 120, the air gaps can be increased and the electrical efficiency can be improved by increasing the intensity of air gap flux, normal-conducting electromagnets having high power consumption or permanent magnets may be employed.

Meanwhile, in order to obtain the power required by the vehicle 200, a method of performing inductive power generation using the rotation of the axle 213 or a method of mounting power generation equipment directly using a belt or a chain (not shown) may be used. Equipment for braking the vehicle 200 may be mounted on the axle 213, or eddy current braking equipment may be coupled to the axle.

Although the preferred embodiments of the present invention have been described so far, the range of the rights of the present invention is not limited thereto, but covers the substantial equivalents of the embodiments of the present invention. It will be apparent to those skilled in the art that various modifications are possible within the range which does not depart from the spirit of the invention.

INDUSTRIAL APPLICABILITY

The present invention relates, in general, to a wheel-type high-speed railway system, and, more particularly, to a wheel-type high-speed railway system that enables stable travel at high speed in the range of 400~1000 km/h even when standard steel wheels for a normal railway are used.

The invention claimed is:

1. A wheel-type high-speed railway system, comprising:
rails provided on a railroad track and configured such that wheels provided in a bogie of a vehicle come into contact with them;
a support provided on a tread surface of a railroad track between the rails;
a repulsive Linear Synchronous Motor (LSM) provided between the bogie and the support and configured to generate a repulsive force and a propulsive force and to improve traveling performance by reducing axle load in a high-speed region;
first and second steel plates mounted on both sides of the support in inclined positions;
first and second attractive Dynamic Motion Control (DMC) magnets mounted on the bogie of the vehicle in inclined positions to correspond to the first and second steel plates, and configured to generate attractive force;
first and second actuators provided on the bogie of the vehicle and configured to control a displacement and angle of first and second electromagnets of the first and second attractive DMC magnets;
air gap detection means provided on the bogie of the vehicle and configured to detect air gaps between the first and second attractive DMC magnets and the first and second steel plates, the air gap detection means being formed of a laser sensor;
a control device receiving detected information from the air gap detection means, calculating distances of the air gaps using the detected information, and controlling the first and second attractive DMC magnets; and
a liquefied nitrogen tank provided in a car body of the vehicle, the liquefied nitrogen tank cooling the wheels, wherein:
the first and second steel plates and the first and second attractive DMC magnets are inclined inward and upward at an angle in a range of 30-60°, such that the attractive force generated by the first and second attractive DMC magnets includes a normal component which acts in a downward direction that is opposite to a direction of the repulsive force generated by the repulsive LSM which acts in a direction extending upwards from a central line of the railroad track, to suppress an upward movement of the vehicle.

2. The wheel-type high-speed railway system according to claim 1, wherein the railroad track is a tube-type railroad track having a vacuum pressure which is $1/5$-$1/1000$ of an atmospheric pressure.

3. The wheel-type high-speed railway system according to claim 1, wherein the repulsive LSM comprises onboard electromagnets provided on the bogie and stator coils provided in an upper portion of a support fastened to a top of the railroad track.

4. The wheel-type high-speed railway system according to claim 1, wherein an interval between the rails is a standard track gauge.

5. The wheel-type high-speed railway system according to claim 1, wherein the control device receives a signal regarding the air gap between the first and second attractive DMC magnets and the first and second steel plates, receives a signal regarding a section of the railroad track and a speed signal, receives information about lateral pressure and a wheel shaft, and receives a signal regarding a magnitude of the propulsive force generated by the repulsive LSM, and then
the control device controls yawing of the wheels to be within a predetermined range, and suppress hunting of the vehicle at a value above a reference value.

6. The wheel-type high-speed railway system according to claim 1, wherein each of the first and second steel plates has a lower surface facing the railroad track and an upper surface opposite to the lower surface, and the first and second attractive DMC magnets are respectively disposed to face the upper surface of each of the first and second steel plates.

* * * * *